United States Patent
Davis

(10) Patent No.: US 10,857,971 B1
(45) Date of Patent: Dec. 8, 2020

(54) SYSTEM AND METHOD OF MONITORING AND MANAGING A CHILD SEATBELT

(71) Applicant: Lemuel Alexander Davis, Elmsford, NY (US)

(72) Inventor: Lemuel Alexander Davis, Elmsford, NY (US)

(*) Notice: Subject to any disclaimer, the term of this patent is extended or adjusted under 35 U.S.C. 154(b) by 0 days.

(21) Appl. No.: 16/813,562

(22) Filed: Mar. 9, 2020

(51) Int. Cl.
| | |
|---|---|
| *B60Q 1/00* | (2006.01) |
| *B60R 22/48* | (2006.01) |
| *B60N 2/26* | (2006.01) |
| *B60N 2/28* | (2006.01) |

(52) U.S. Cl.
CPC .............. *B60R 22/48* (2013.01); *B60N 2/265* (2013.01); *B60N 2/2812* (2013.01); *B60N 2002/2815* (2013.01); *B60R 2022/4816* (2013.01); *B60R 2022/4866* (2013.01)

(58) Field of Classification Search
CPC ....... B60R 22/48; B60R 22/35; B60R 22/357; B60R 22/105; B60R 22/3416; B60R 2022/1806; B60Q 9/00; B60Q 5/005; B60Q 3/242; B60N 2/002; B60N 2/28; B60N 2/2812; B60N 2/265; B60N 2/2803; B60N 2/26
See application file for complete search history.

(56) References Cited

U.S. PATENT DOCUMENTS

| | | | |
|---|---|---|---|
| 8,217,796 B2 | 7/2012 | Trummer | |
| 9,173,087 B2 | 10/2015 | Pallotta | |
| 9,266,535 B2 * | 2/2016 | Schoenberg | ............. B60N 2/28 |
| 9,424,728 B2 | 8/2016 | Rambadt et al. | |
| 9,663,032 B1 * | 5/2017 | Appukutty | ............. B60N 2/002 |
| 9,796,303 B1 | 10/2017 | Schonfeld et al. | |
| 10,053,054 B1 | 8/2018 | Chiang | |
| 2019/0106082 A1 * | 4/2019 | Kleinert | .............. B60R 22/3416 |
| 2019/0359129 A1 * | 11/2019 | Elliott | ..................... G08B 21/22 |

FOREIGN PATENT DOCUMENTS

EP          1704790 A1      6/2010

* cited by examiner

*Primary Examiner* — Toan N Pham

(57) ABSTRACT

A system and method of monitoring and managing a child seatbelt ensures a child is secured before and during a car ride. The system used to implement the method includes a vehicle with at least one child seatbelt, an onboard computer, and at least one computerized seatbelt adapter. The at least one child seatbelt includes a seatbelt tongue and a seatbelt buckle. The seatbelt adapter includes a tongue receiver, a buckle insert, and an adapter lock. The method begins by inserting the seatbelt tongue into the tongue receiver. The adapter lock secures the seatbelt tongue within the tongue receiver, if the ignition is on, and if the vehicle is in a driving mode. The adapter lock is disengaged to release the seatbelt tongue from the tongue receiver if the ignition is off, and if the vehicle is parked. The seatbelt tongue may then be safely removed from the tongue receiver.

11 Claims, 12 Drawing Sheets

US 10,857,971 B1

SYSTEM AND METHOD OF MONITORING AND MANAGING A CHILD SEATBELT

FIELD OF THE INVENTION

The present invention generally relates to child safety in vehicles. More specifically, the present invention monitors and remotely controls a child seatbelt.

BACKGROUND OF THE INVENTION

Child safety within a vehicle is critical for every car ride and is a determining factor between life and death in the event of a car accident or an oversight of a driver. Although car seats do provide a seatbelt, the lock of the seatbelt may be accidently disengaged, not firmly secured, or malfunction. In the event of any reason for failure, there is no backup that ensures the safety of a child during a car ride. Leaving a child in a vehicle is also a common and easy mistake to make as a caregiver which may also result in serious injury or a fatality given the conditions of the surrounding environment.

It is therefore an objective of the present invention to serve as a secondary security system for a car seat. The present invention not only physically secures the connection of the seatbelt around a child but monitors the safety of the surrounding environment of the child within the car seat. The present invention allows a driver to focus on the road as well, while being able to easily and safely view the child and be aware of any malfunctions that may increase the risk of child safety within the vehicle. The present invention ensures a driver is constantly aware of the condition of a child in a car seat.

DETAIL DESCRIPTIONS OF THE INVENTION

All illustrations of the drawings are for the purpose of describing selected versions of the present invention and are not intended to limit the scope of the present invention.

Figure 1:
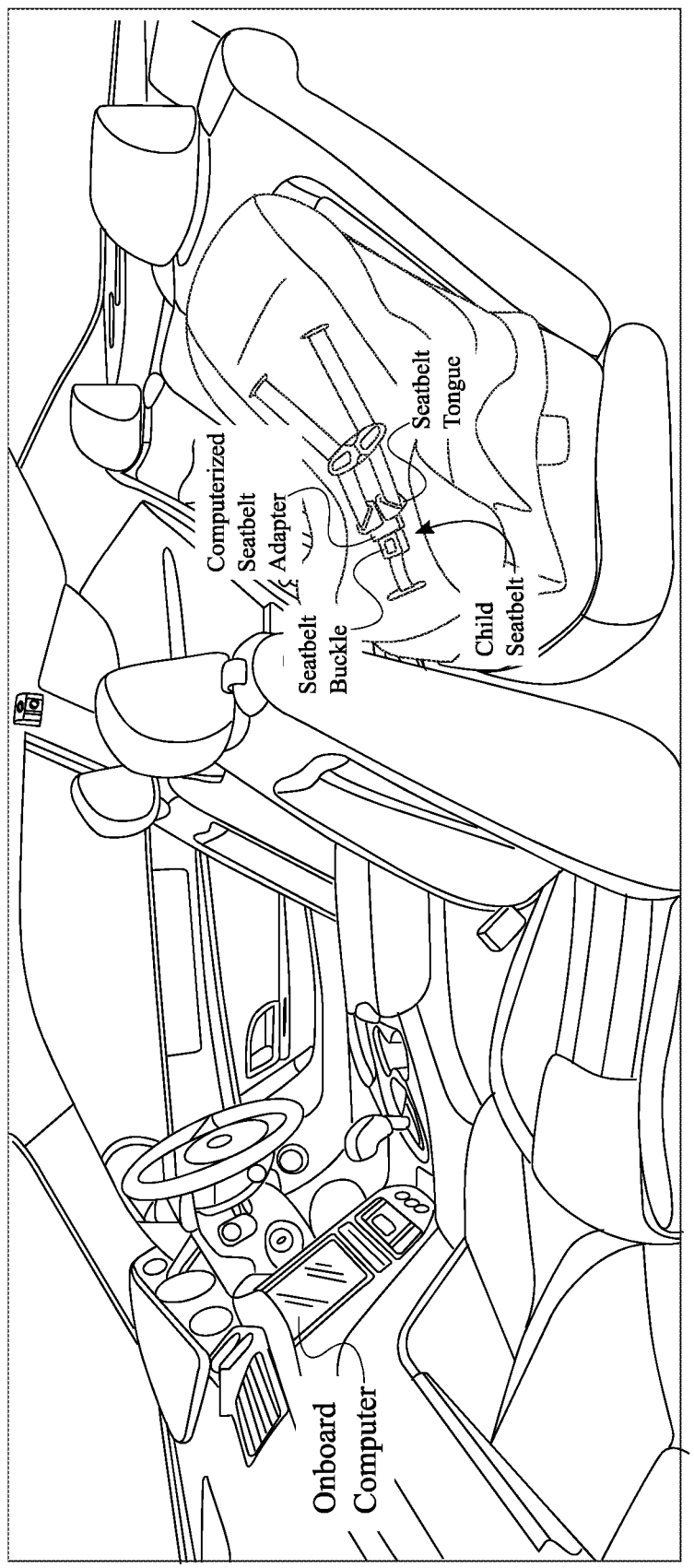
FIG. 1 is a schematic view for a method of the present invention.

The present invention is a system and method of monitoring and managing a child seatbelt. The present invention monitors the security of a child in a car seat. Moreover, the present invention notifies and alerts a driver if the environment around the child positioned within the car seat is not safe. Thus, the physical system used to implement the method for the present invention includes a vehicle with at least one child seatbelt and an onboard computer (Step A), as seen in FIG. 1. The vehicle transports and protects individuals within the vehicle, and the at least one child seatbelt secures a child into preferably secures a car seat. The car seat may include, but is not limited to, a baby or infant-only car seat, a convertible car seat, and a booster seat. The child seatbelt includes a seatbelt tongue and a seatbelt buckle. The seatbelt tongue and the seatbelt buckle attaches and detaches straps of the child seatbelt around the child. The onboard computer monitors all safety connections of the vehicle, especially the connection between the seatbelt tongue and the seatbelt buckle. The onboard computer also processes commands. The physical system of the present invention further includes at least one computerized seatbelt adapter (Step B), wherein the computerized seatbelt adapter is communicably coupled with the onboard computer. The at least one computerized seatbelt adapter further locks, monitors the connection of the seatbelt tongue and the seatbelt, and further locks the seatbelt tongue with the seatbelt. Moreover, the computerized seatbelt adapter includes a tongue receiver, a buckle insert, and an adapter lock, wherein the buckle insert is secured into the seatbelt buckle. The tongue receiver and the buckle insert allow the computerized seatbelt adapter to be positioned in between the seatbelt tongue and the seatbelt buckle. The adapter lock automatically engages and disengages the seatbelt tongue with the seatbelt buckle. The adapter lock is preferably a magnetic clamp pin. However, alternate embodiments of the present invention may include adapter locks of varying locking mechanisms.

Figure 2:
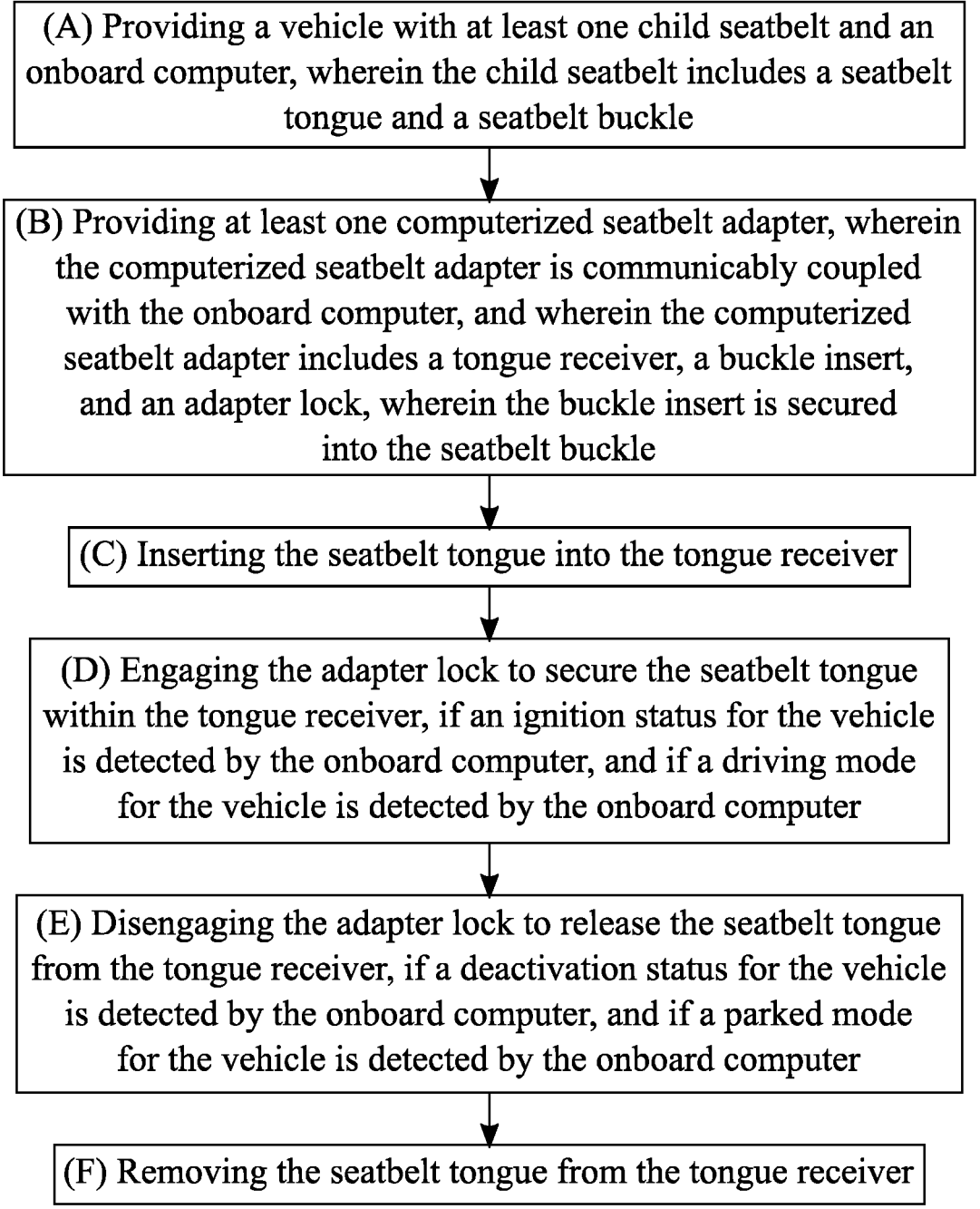
FIG. 2 is a flowchart illustrating the overall process for a method of the present invention.

The overall process for the method of the present invention includes the following steps that are implemented with the vehicle, the at least one child seatbelt, the onboard computer, and the at least one computerized seatbelt adapter. As seen in FIG. 2, the overall process begins by inserting the seatbelt tongue into the tongue receiver (Step C). This positions the adapter lock between the seatbelt tongue and the seatbelt buckle, establishing a connection between the seatbelt tongue and the seatbelt buckle. The safety of a child positioned within the car seat is ensured as the adapter lock is engaged to secure the seatbelt tongue within the tongue receiver, if an ignition status for the vehicle is detected by the onboard computer, and if a driving mode for the vehicle is detected by the onboard computer (Step D). This automatic engagement prevents a driver from operating the vehicle without first securing a child into the car seat. The adapter lock is disengaged to release the seatbelt tongue from the tongue receiver, if a deactivation status for the vehicle is detected by the onboard computer, and if a parked mode for the vehicle is detected by the onboard computer (Step E). The automatic disengagement facilitates the quick removal of the child from the car seat, especially in the event of an emergency. The seatbelt tongue is removed from the tongue receiver (Step F) so that the child does not accidentally fall or escape from the car seat. Moreover, the driver must manually separate the seatbelt tongue from the tongue receiver in order safely remove the child from the car seat.

Figure 3:
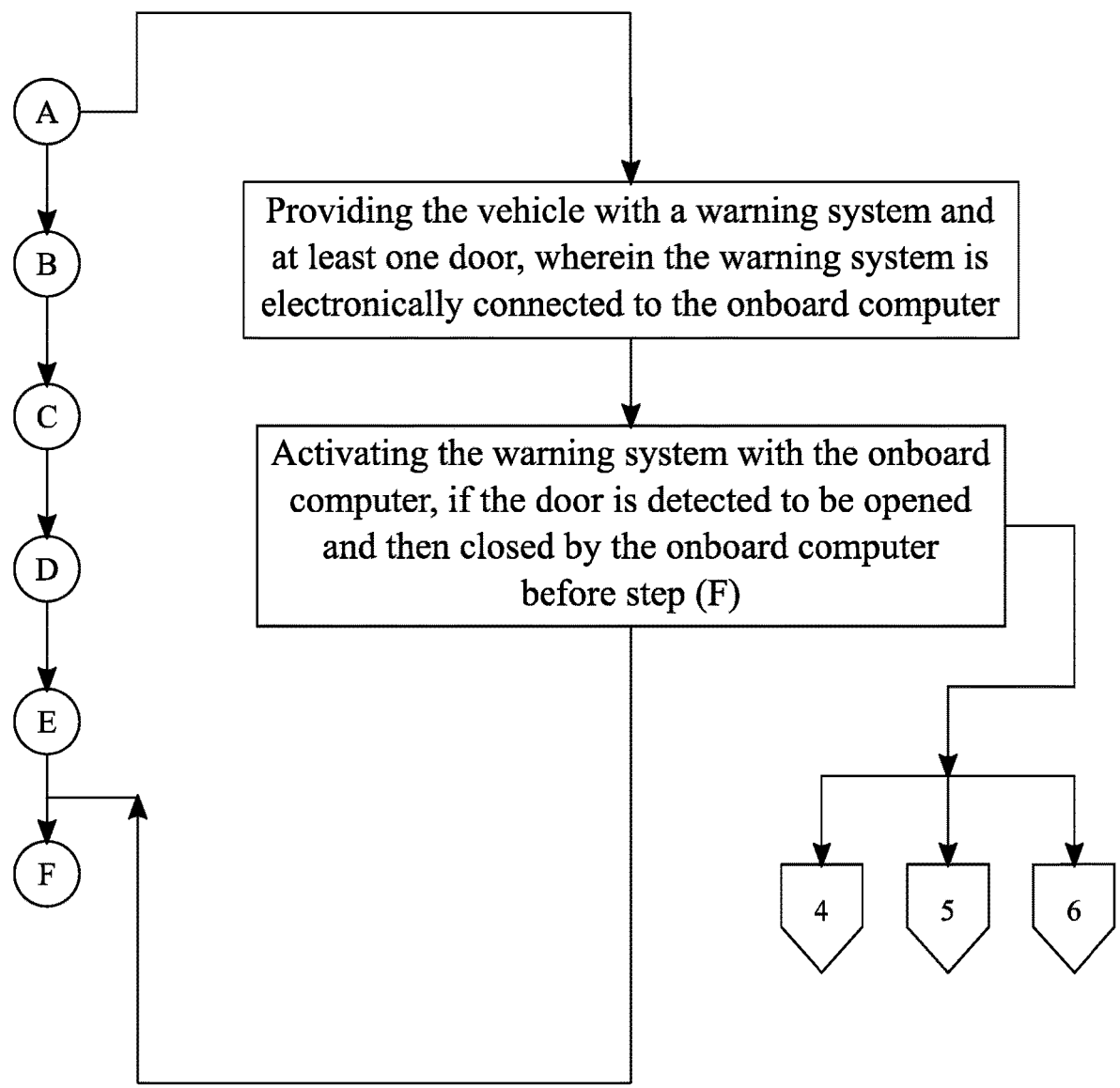
FIG. 3 is a flowchart illustrating the subprocess for activating a warning system for a vehicle door.
Figure 4:
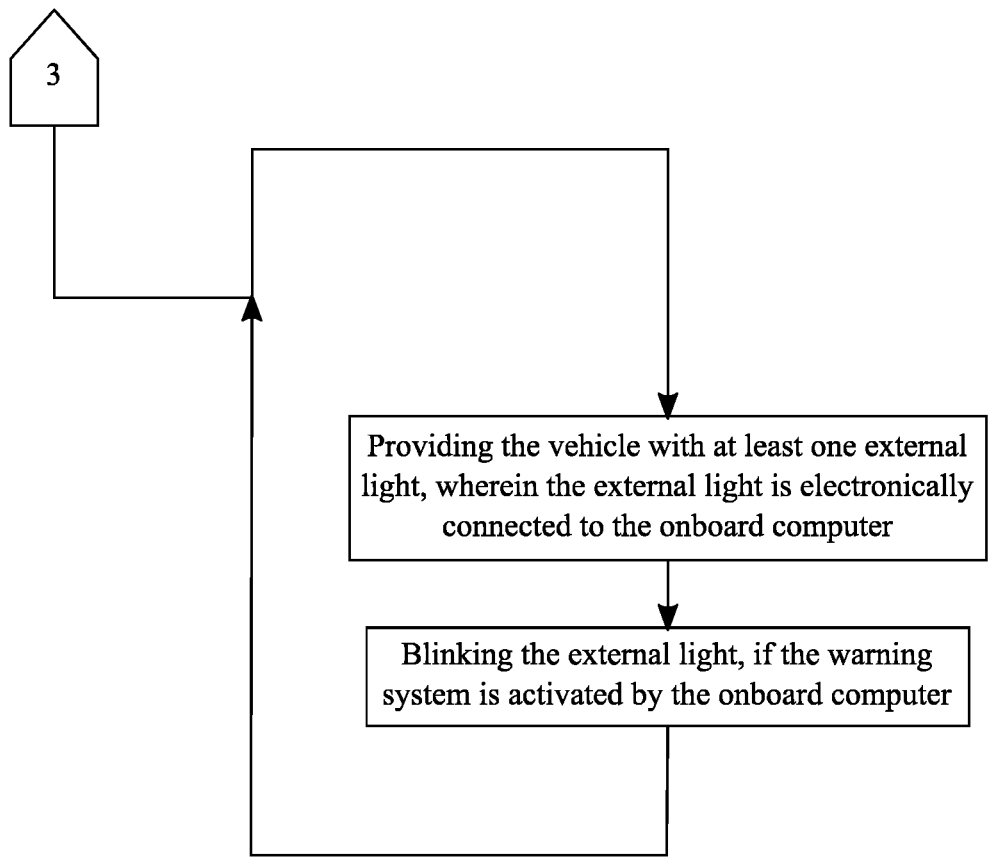
FIG. 4 is a flowchart illustrating the subprocess for activating the warning system for a vehicle door by blinking an external light.
Figure 5:
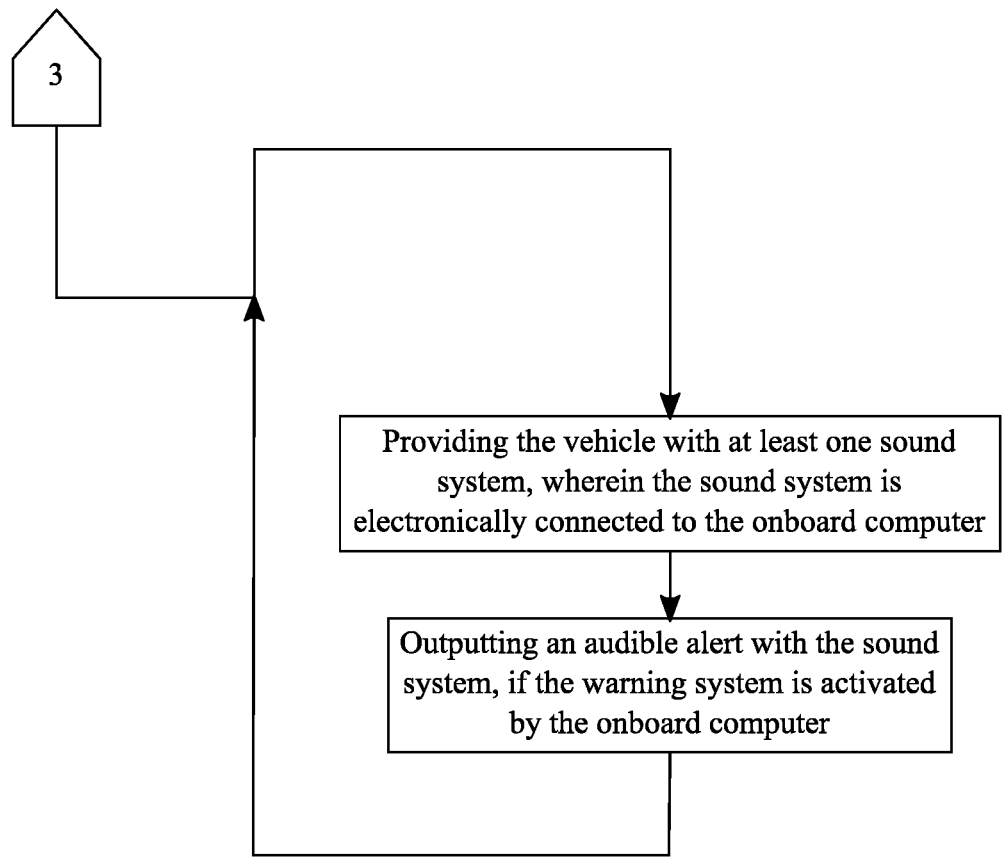
FIG. 5 is a flowchart illustrating the subprocess for activating the warning system for a vehicle door by outputting an audible alert.
Figure 6:
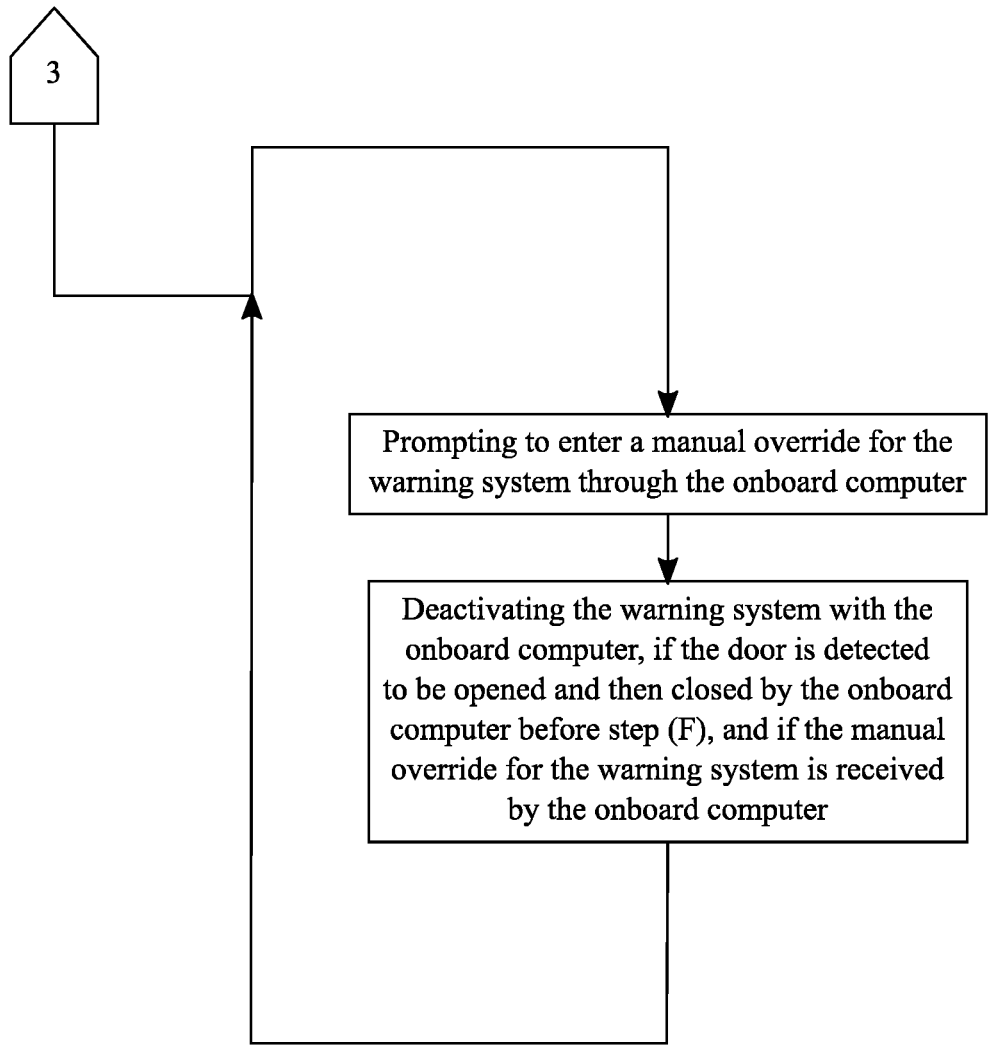
FIG. 6 is a flowchart illustrating the subprocess for deactivating the warning system.

The present invention further enhances the safety of the vehicle as the vehicle is provided with a warning system and at least one door, wherein the warning system is electronically connected to the onboard computer, seen in FIG. 3. The warning system immediately notifies the user if a child is left in a car seat once the door is opened and then closed. The at least one door is preferably the door that is adjacent the car seat. However, it is understood that any and all doors may be monitored with the onboard computer and connected with the warning system. The warning system is activated with the onboard computer, if the door is detected to be opened and then closed by the onboard computer before Step F, ensuring the door is closed during a car ride and the child is removed from the car seat one the door has been opened and then closed. Furthermore, the vehicle is provided with at least one external light, wherein the external light is electronically connected to the onboard computer, seen in FIG. 4. The at least one external light provides a visual alert for the driver. The external light blinks, if the warning system is activated by the onboard computer, notifying the driver that the at least one door is opened before or during the car ride with the vehicle. In the preferred embodiment of the present invention, the external light of the vehicle that blink includes, but is not limited to, the turn signals of the vehicle. The vehicle is also provided with at least one sound system, wherein the sound system is electronically connected to the onboard computer, seen in FIG. 5. The sound system audibly alerts the driver. An audible alert is outputted with the sound system, if the warning system is activated by the onboard computer. The audible alert is preferably a beeping sound. In the event the warning system should not be activated, a manual override is prompted to be entered for the warning system through the onboard computer, seen in FIG. 6. The manual override may be a button selection or a passcode that must be entered with the onboard computer. The warning system is then deactivated with the onboard computer, if the door is detected to be opened and then closed by the onboard computer before Step F, and if the manual override for the warning system is received by the onboard computer. The warning system is deactivated if a child may be left in the car seat after the door has been opened and closed, preferably with supervision.

Figure 7:
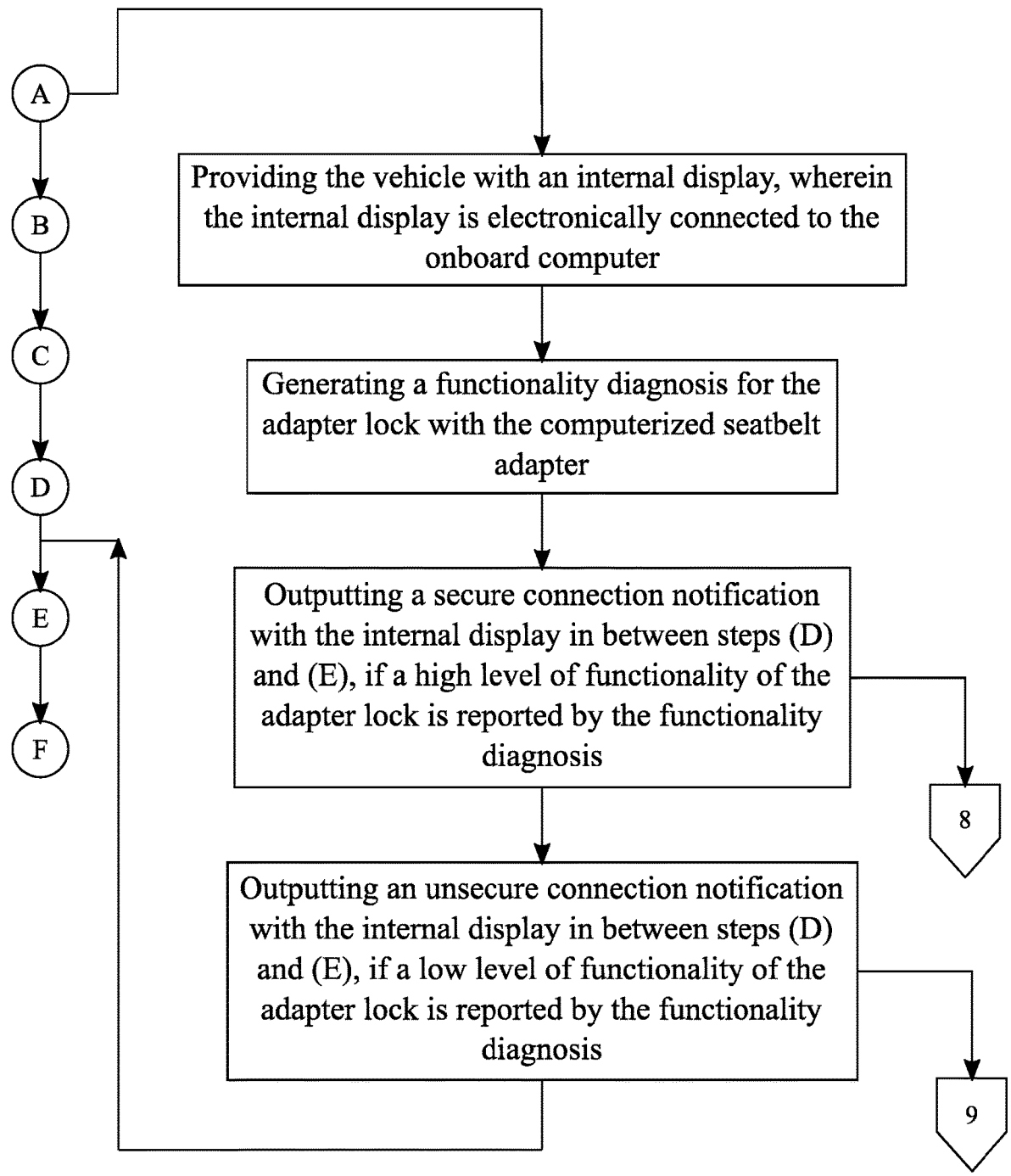
FIG. 7 is a flowchart illustrating the subprocess for outputting a secure connection notification or an unsecure connection notification with the internal display system based on the level of functionality of the adapter lock.
Figure 8:
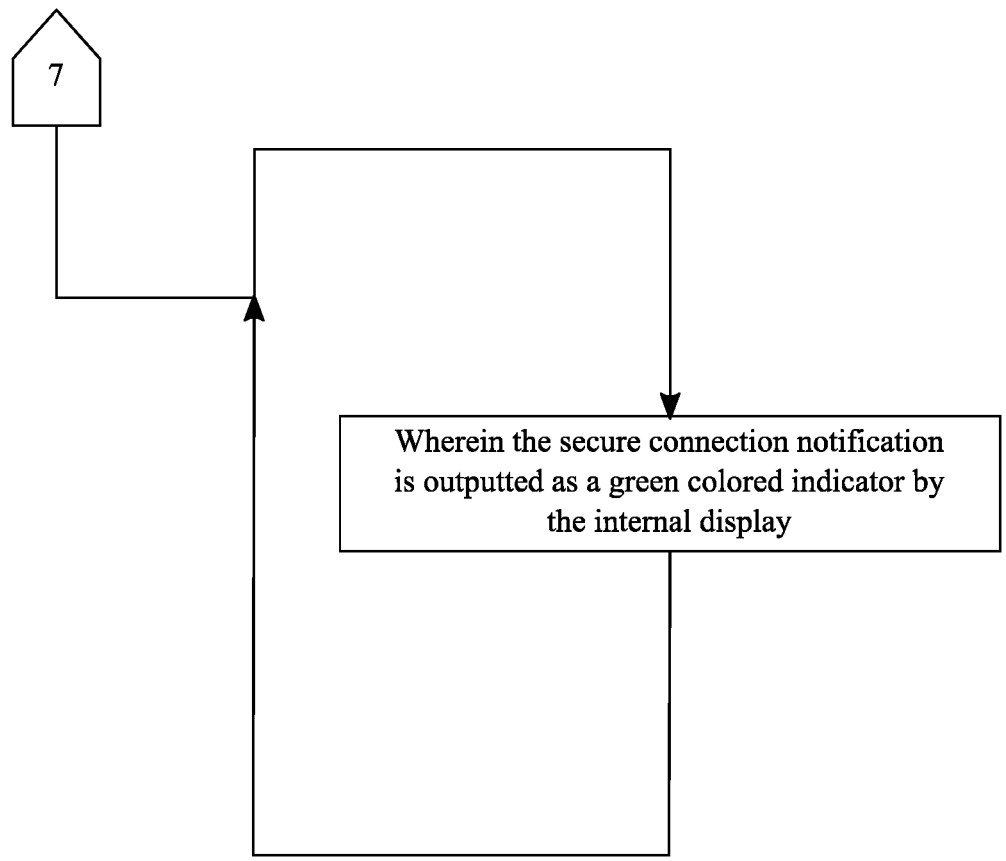
FIG. 8 is a flowchart illustrating the subprocess for outputting a green color indicator for the secure connection notification.
Figure 9:
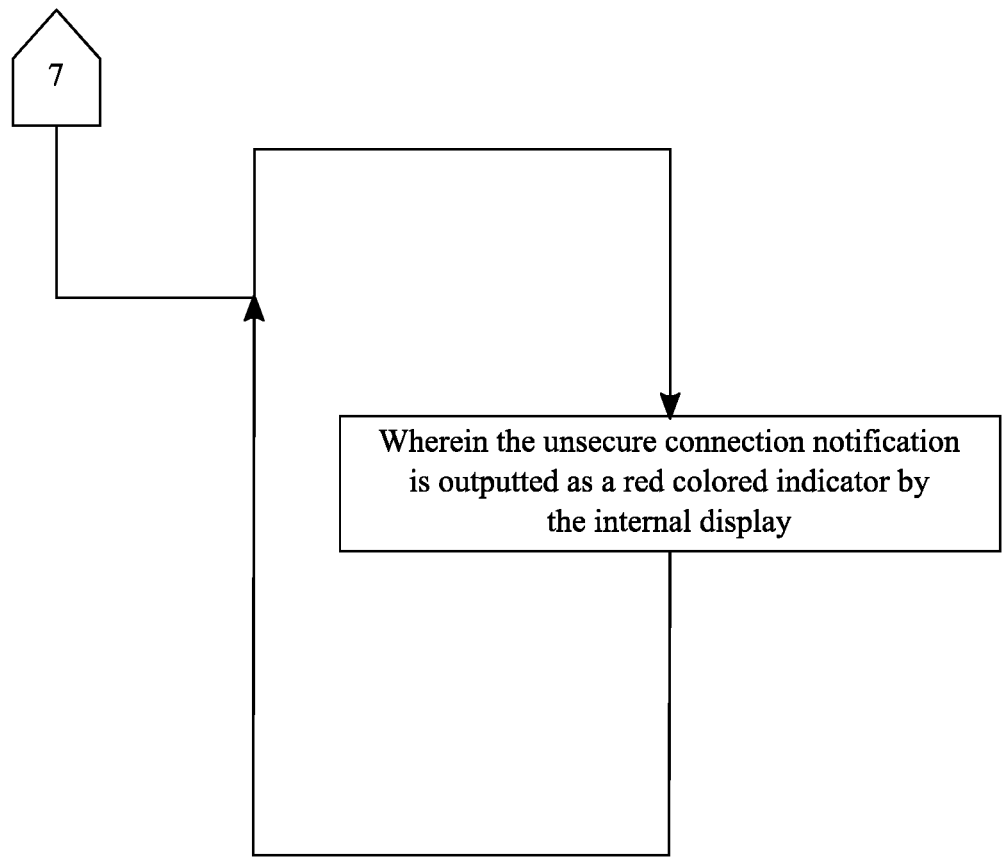
FIG. 9 is a flowchart illustrating the subprocess for outputting a red color indicator for the unsecure connection notification.

The driver is further able to remotely control the adapter lock with the child seatbelt as the vehicle is provided with an internal display, wherein the internal display is electronically connected to the onboard computer, seen in FIG. 7. The internal display is a screen that provides real-time status for the driver across the dashboard of the vehicle for easy and safe viewing. A functionality diagnosis is generated for the adapter lock with the computerized seatbelt adapter. The functionality diagnosis is the status of the connection between the seatbelt tongue, the seatbelt buckle, and the seatbelt adapter. A secure connection notification is outputted with the internal display in between Step D and Step E, if a high level of functionality of the adapter lock is reported by the functionality diagnosis. The secure connection notification indicates a proper engagement between the adapted lock and the child seatbelt. The secure connection notification is outputted as a green color indicator by the internal display, as seen in FIG. 8. An unsecure connection notification is outputted with the internal display in between Step D and Step E, if a low level of functionality of the adapter lock is reported by the functionality diagnosis. The unsecure connection notification indicates an improper engagement between the adapter lock and the child seatbelt. The unsecure connection notification is outputted as a red colored indicator by the internal display, as seen in FIG. 9.

Figure 10:
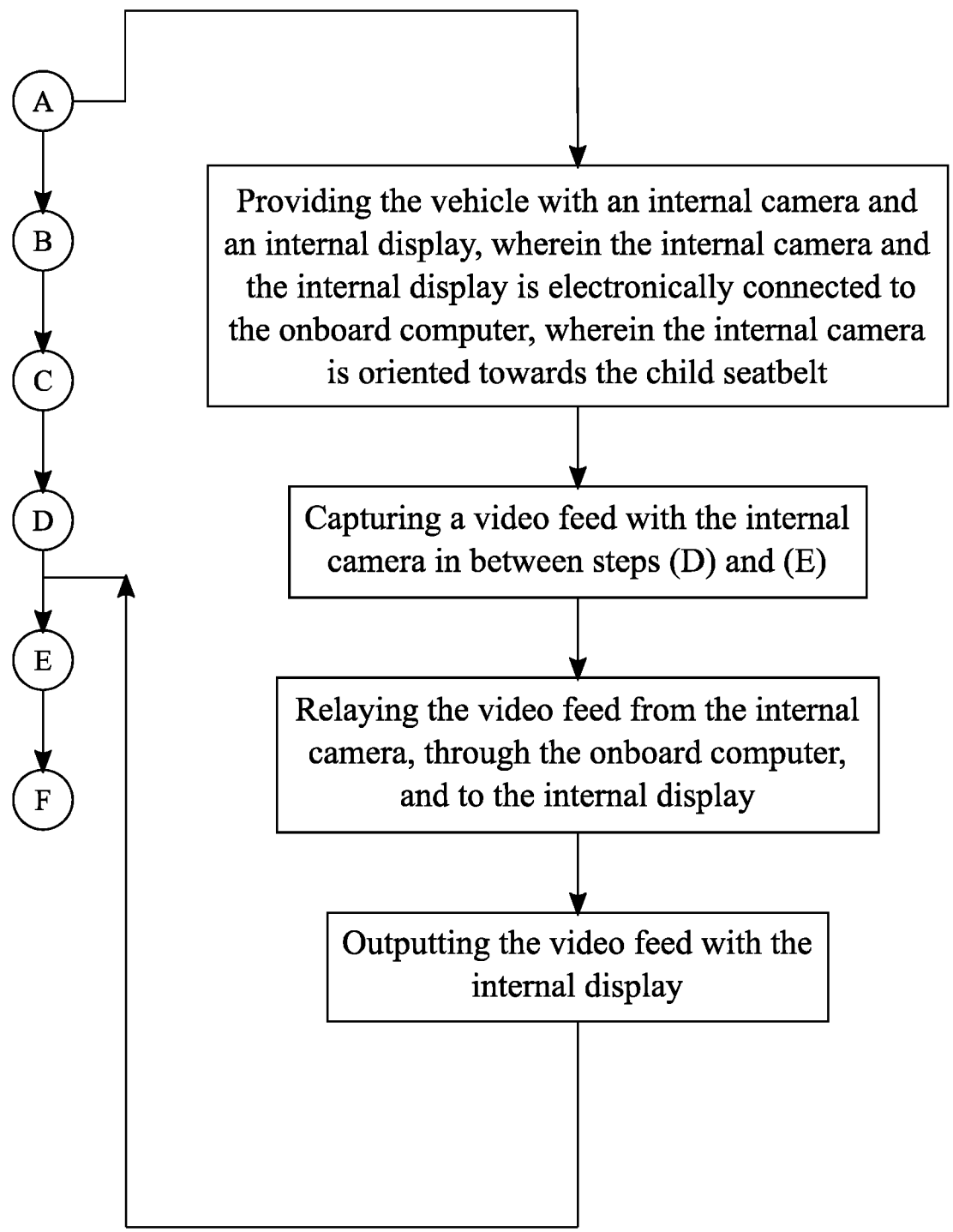
FIG. 10 is a flowchart illustrating the subprocess for outputting a video feed with an internal display.

The driver is further able to visually monitor a child in the car seat as the vehicle is provided with an internal camera and an internal display, seen in FIG. 10. The internal camera and the internal display are electronically connected to the onboard computer, and the internal camera is oriented towards the child seatbelt. The internal display provides real-time visual coverage of the car seat with the child and the area around the car seat with the internal camera. This prevents a driver from physically turning around to view the child in the car seat and preserves constant focus on the road. A video feed is captured with the internal camera in between Step D and Step E. The video feed presents the child in the car seat and the surrounding area. The video feed is relayed from the internal camera, through the onboard computer, and to the internal display, as to provide coverage of the child in the car seat across the dashboard of the vehicle. More specifically, the video feed is outputted with the internal display.

Figure 11:
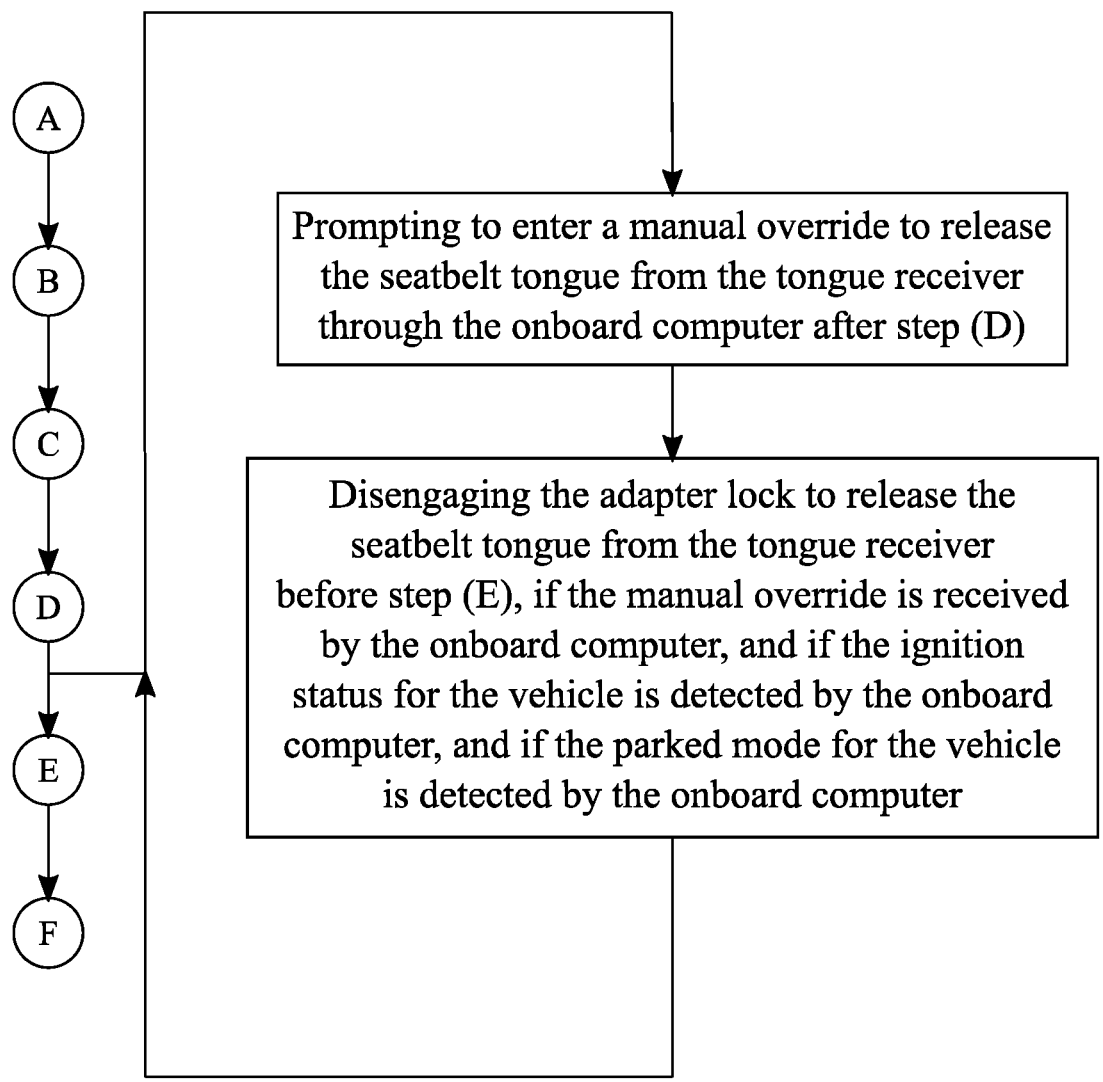
FIG. 11 is a flowchart illustrating the subprocess for disengaging the adapter lock if a manual override is received while the vehicle is parked.

In the event a child needs to be removed from the car seat while the vehicle is moving, a manual override is prompted to be entered to release the seatbelt tongue from the tongue receiver through the onboard computer after Step D, seen in FIG. 11. The adapter lock is disengaged to release the seatbelt tongue from the tongue receiver before Step E, if the manual override is received by the onboard computer, and if the ignition status for the vehicle is detected by the onboard computer, and if the parked mode for the vehicle is detected by the onboard computer. This automatically separates the seatbelt tongue from the adapter lock so that the child is accessible and separated from the car seat for any emergency or any urgent retrieval of the child.

Figure 12:
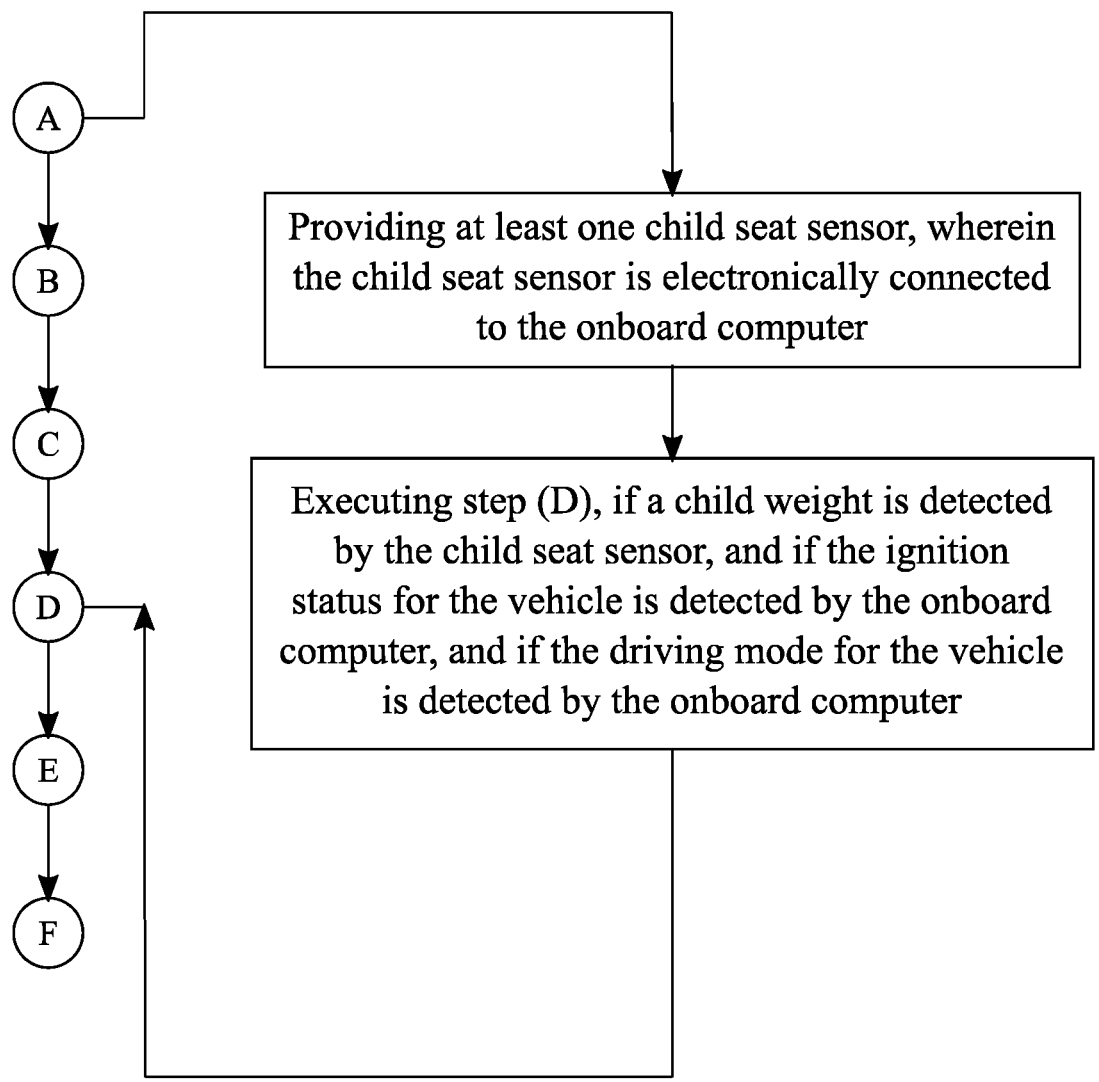
FIG. 12 is a flowchart illustrating the subprocess for engaging the adapter lock if a child weight is detected with a child seat sensor.

The presence of a child in the car seat is ensured as at least one child seat sensor is provided, wherein the child seat sensor is electronically connected to the onboard computer, seen in FIG. 12. Moreover, the warning system and the adapter lock are not accidentally activated unless the child is physically positioned within the car seat. Step D is executed, if a child weight is detected by the child sensor, and if the ignition status for the vehicle is detected by the onboard computer, and if the driving mode for the vehicle is detected by the onboard computer. The weight of the child determines if the child is sitting in the car seat before the car ride even begins. The ignition status and the driving mode for the vehicle are prerequisites that determine whether the warning system and the adapter lock are activated.

Although the invention has been explained in relation to its preferred embodiment, it is to be understood that many other possible modifications and variations can be made without departing from the spirit and scope of the invention as hereinafter claimed.

What is claimed is:

1. A method of monitoring and managing a child seatbelt, the method comprises the steps of:
   (A) providing a vehicle with at least one child seatbelt and an onboard computer, wherein the child seatbelt includes a seatbelt tongue and a seatbelt buckle;
   (B) providing at least one computerized seatbelt adapter, wherein the computerized seatbelt adapter is communicably coupled with the onboard computer, and wherein the computerized seatbelt adapter includes a tongue receiver, a buckle insert, and an adapter lock, wherein the buckle insert is secured into the seatbelt buckle;

(C) inserting the seatbelt tongue into the tongue receiver;

(D) engaging the adapter lock to secure the seatbelt tongue within the tongue receiver, if an ignition status for the vehicle is detected by the onboard computer, and if a driving mode for the vehicle is detected by the onboard computer;

(E) disengaging the adapter lock to release the seatbelt tongue from the tongue receiver, if a deactivation status for the vehicle is detected by the onboard computer, and if a parked mode for the vehicle is detected by the onboard computer; and, (F) removing the seatbelt tongue from the tongue receiver.

2. The method of monitoring and managing the child seatbelt, the method as claimed in claim 1 comprises the steps of:

providing the vehicle with a warning system and at least one door, wherein the warning system is electronically connected to the onboard computer; and, activating the warning system with the onboard computer, if the door is detected to be opened and then closed by the onboard computer before step (F).

3. The method of monitoring and managing the child seatbelt, the method as claimed in claim 2 comprises the steps of:

providing the vehicle with at least one external light, wherein the external light is electronically connected to the onboard computer; and, blinking the external light, if the warning system is activated by the onboard computer.

4. The method of monitoring and managing the child seatbelt, the method as claimed in claim 2 comprises the steps of:

providing the vehicle with at least one sound system, wherein the sound system is electronically connected to the onboard computer; and, outputting an audible alert with the sound system, if the warning system is activated by the onboard computer.

5. The method of monitoring and managing the child seatbelt, the method as claimed in claim 2 comprises the steps of:

prompting to enter a manual override for the warning system through the onboard computer;

deactivating the warning system with the onboard computer, if the door is detected to be opened and then closed by the onboard computer before step (F), and if the manual override for the warning system is received by the onboard computer.

6. The method of monitoring and managing the child seatbelt, the method as claimed in claim 1 comprises the steps of:

providing the vehicle with an internal display, wherein the internal display is electronically connected to the onboard computer;

generating a functionality diagnosis for the adapter lock with the computerized seatbelt adapter;

outputting a secure connection notification with the internal display in between steps (D) and (E), if a high level of functionality of the adapter lock is reported by the functionality diagnosis;

outputting an unsecure connection notification with the internal display in between steps (D) and (E), if a low level of functionality of the adapter lock is reported by the functionality diagnosis.

7. The method of monitoring and managing the child seatbelt, the method as claimed in claim 6, wherein the secure connection notification is outputted as a green colored indicator by the internal display.

8. The method of monitoring and managing the child seatbelt, the method as claimed in claim 6, wherein the unsecure connection notification is outputted as a red colored indicator by the internal display.

9. The method of monitoring and managing the child seatbelt, the method as claimed in claim 1 comprises the steps of:

providing the vehicle with an internal camera and an internal display, wherein the internal camera and the internal display is electronically connected to the onboard computer, and wherein the internal camera is oriented towards the child seatbelt;

capturing a video feed with the internal camera in between steps (D) and (E);

relaying the video feed from the internal camera, through the onboard computer, and to the internal display; and, outputting the video feed with the internal display.

10. The method of monitoring and managing the child seatbelt, the method as claimed in claim 1 comprises the steps of:

prompting to enter a manual override to release the seatbelt tongue from the tongue receiver through the onboard computer after step (D); and, disengaging the adapter lock to release the seatbelt tongue from the tongue receiver before step (E), if the manual override is received by the onboard computer, and if the ignition status for the vehicle is detected by the onboard computer, and if the parked mode for the vehicle is detected by the onboard computer.

11. The method of monitoring and managing the child seatbelt, the method as claimed in claim 1 comprises the steps of:

providing at least one child seat sensor, wherein the child seat sensor is electronically connected to the onboard computer; and, executing step (D), if a child weight is detected by the child seat sensor, and if the ignition status for the vehicle is detected by the onboard computer, and if the driving mode for the vehicle is detected by the onboard computer.

* * * * *